(12) United States Patent
Fujimura

(10) Patent No.: US 6,250,677 B1
(45) Date of Patent: Jun. 26, 2001

(54) AIRBAG DEVICE WITH POSITION ADJUSTING MECHANISM

(75) Inventor: Yoshiichi Fujimura, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/502,489

(22) Filed: Feb. 11, 2000

(30) Foreign Application Priority Data

Feb. 12, 1999 (JP) .................................................. 11-034414

(51) Int. Cl.⁷ ................................................. B60R 21/16
(52) U.S. Cl. .................................... 280/743.2; 280/730.1; 280/732
(58) Field of Search ............................. 280/728.1, 730.1, 280/743.2, 732

(56) References Cited

U.S. PATENT DOCUMENTS

| | | | |
|---|---|---|---|
| 5,762,367 | * 6/1998 | Wolanin | 280/743.2 |
| 5,957,490 | * 9/1999 | Sinnhuber | 280/743.2 |
| 6,129,379 | * 10/2000 | Specht | 280/743.2 |

* cited by examiner

*Primary Examiner*—Kenneth R. Rice
(74) *Attorney, Agent, or Firm*—Kanesaka & Takeuchi

(57) ABSTRACT

An airbag device is formed of an airbag, a holding device for holding the airbag, a gas supply device for supplying gas into the airbag to inflate the same, and an adjusting device connected to the holding device. Upon inflation of the airbag, the adjusting device is actuated to move the holding device for adjusting a location of the airbag. When a vehicle collision speed is less than a predetermined speed, or when a weight of an occupant in the seat is less than a predetermined value, upon inflation of the airbag, the holding device is moved backward. Thus, the distal end position of the airbag is adjusted in accordance with the vehicle collision speed and the weight of the occupant.

10 Claims, 3 Drawing Sheets

AIRBAG DEVICE WITH POSITION ADJUSTING MECHANISM

BACKGROUND OF THE INVENTION AND RELATED ART STATEMENT

The present invention relates to an airbag device for protecting an occupant in a movable subject, such as a vehicle, in case of emergency, such as a collision of the vehicle.

An airbag device installed in a vehicle, for example, an automobile, includes a folded airbag, a housing member for accommodating the airbag, and an inflator (gas generator) for inflating the airbag by spouting or ejecting a gas in the event of the collision.

In most of the airbag devices for a driver's seat, the housing member is formed of a retainer and a module cover which can be opened or torn. The airbag and the inflator are attached to the retainer, and the airbag is covered by the module cover. When the inflator is actuated, the module cover is opened or torn, so that the airbag is inflated toward an interior of the vehicle.

In most of the airbag devices for a front passenger's seat, the folded airbag is accommodated in a container in the form of a receptacle, and the container is covered by a lid. When the inflator is actuated, the lid is opened, or starts opening like a door, so that the airbag is inflated in the interior of the vehicle.

As one kind of the conventional airbag devices, there is an airbag device wherein a tether belt is disposed inside the airbag. One or front end of the tether belt is sewn to a distal end portion of the airbag, and a rear end thereof is connected to the retainer or container. In case the inflator is actuated, the airbag is inflated until the tether belt is stretched tightly.

In the conventional airbag device, however, in case the inflator is being actuated to inflate the airbag, a protruding length of the airbag from the retainer or the container can not be adjusted.

Accordingly, an object of the present invention is to provide an airbag device, wherein an airbag user can be protected based on a condition of a vehicle and/or user.

Another object of the invention is to provide an airbag device, wherein a protruding length of the airbag from an airbag holding device can be adjusted based on a vehicle speed and user's weight.

A further object of the invention is to provide an airbag device as stated above, wherein the holding condition of the airbag is selected at an optimum value to protect the user.

Further objects and advantages of the invention will be apparent from the following description of the invention.

SUMMARY OF THE INVENTION

To achieve the aforementioned objects, the present invention provides an airbag device which comprises a folded airbag, holding means for holding the airbag, gas supply means for supplying a gas into the airbag to inflate the airbag, and adjusting means for adjusting a location of a distal end of the inflated airbag.

In the airbag device structured as described above, adjusting means may be provided with a movable member connected to a rear portion of the airbag, and means for adjusting a position of the movable member.

Alternatively, the adjusting means may be provided with a belt having one end connected to the distal end of the airbag, and a supporting device for supporting a rear end of the belt, wherein the supporting device is capable of adjusting a length of the belt extending from the supporting device.

According to the airbag device of the present invention, in accordance with a vehicle collision speed, or a position and body size or weight of the occupant, a protruding length of the airbag can be adjusted.

DETAILED DESCRIPTION OF PREFERRED EMBODIMENTS

Hereunder, embodiments of the present invention will be explained with reference to the accompanying drawings.

Figure 3:
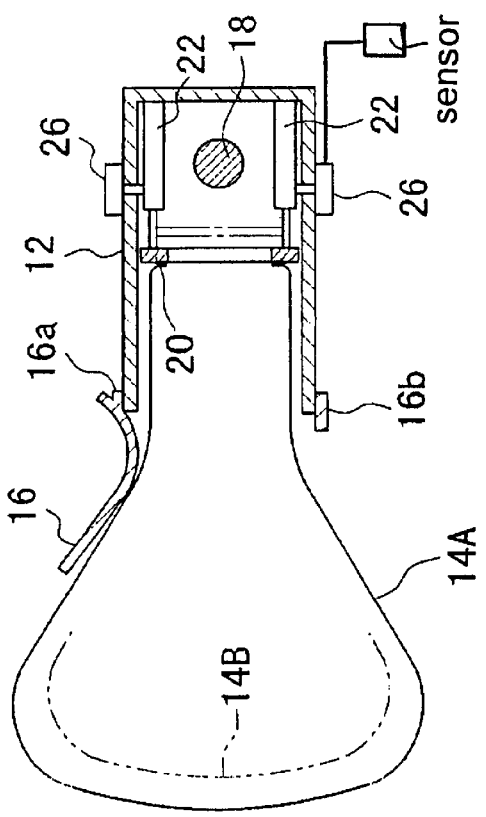
FIG. 3 is an explanatory sectional view showing a state that the airbag device shown in FIGS. 1 and 2 is actuated.
Figure 1:
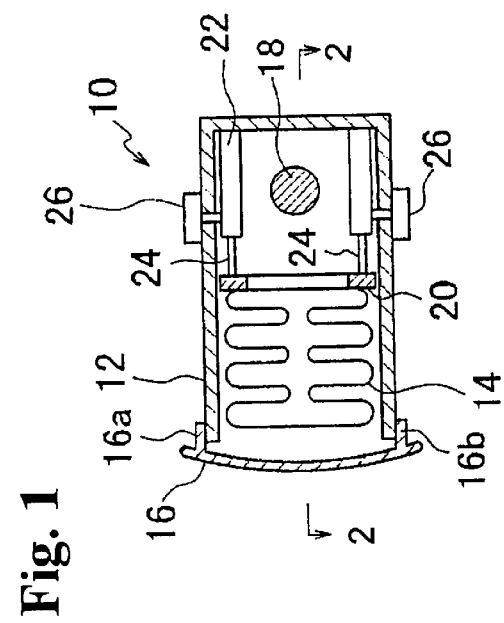
FIG. 1 is an explanatory sectional view of an airbag device for a front passenger's seat according to a first embodiment of the present invention.
Figure 2:
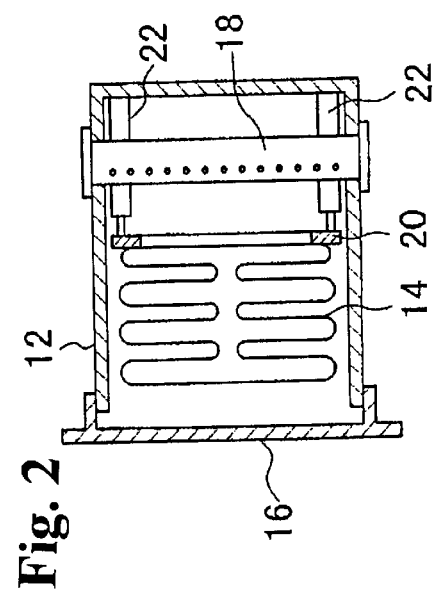
FIG. 2 is a explanatory sectional view taken along line 2—2 in FIG. 1.

FIG. 1 is an explanatory sectional view of an airbag device for a front passenger's seat according to a first embodiment of the present invention; FIG. 2 is an explanatory sectional view taken along line 2—2 in FIG. 1; and FIG. 3 is an explanatory sectional view showing a state that the airbag device shown in FIGS. 1 and 2 is actuated.

An airbag device 10 for a front passenger's seat includes a container 12 in a form of a receptacle with an open front; an airbag 14 folded and stored in the container 12; a lid 16 attached to the front of the container 12; an inflator 18 disposed in a rear side of the container 12; a frame 20 to which a rear end of the airbag 14 is connected; cylinders 22 for advancing and retreating the frame 20; piston rods 24 having a distal end connected to the frame 20; and inflators 26 for actuating the cylinders in order to provide a gas into the cylinders 22 for retreating the piston rods 24. The cylinders 22 are respectively disposed at four corners of the container 12, but a number of the cylinders may be freely decided.

The lid 16 is provided with legs 16a, 16b protruding rearward, and the legs 16a, 16b are respectively connected to the container 12.

In the event of an emergency, such as vehicle collision, the inflator 18 is actuated to spout the gas. Accordingly, the airbag 14 is inflated, and one of the legs, i.e. leg 16b, is torn, so that the lid 16 is opened like a door as shown in FIG. 3. As a result, the airbag 14 is deployed largely inside the vehicle as shown by solid line 14A in FIG. 3. Incidentally, instead of the breaking the leg 16b, it can be structured such that the lid 16 is opened or torn.

When a vehicle collision speed is less than a predetermined speed, or when a weight of the occupant in the front passenger's seat in the vehicle is less than a predetermined value, the inflators 26 for actuating the cylinders are actuated to move the frame backward through the piston rods 24. Accordingly, a protruding length of the airbag 14 from the container 12 becomes, as shown by two-dotted chain line 14B, shorter than that in the solid line 14A. A sensor is attached to the inflators 26 to measure the collision speed and/or weight of the occupant.

Incidentally, an amount of generated or spouted gas can be controlled according to the vehicle collision speed or the weight of the occupant in the front passenger's seat, so as to control the distance of movement of the frame backward.

Figure 4:
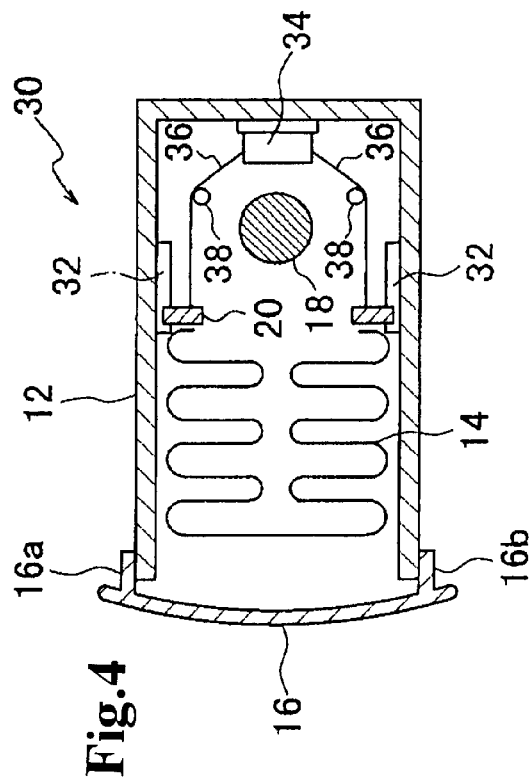
FIG. 4 is an explanatory sectional view of an airbag device for a front passenger's seat according to a second embodiment of the invention.

FIG. 4 is an explanatory sectional view of an airbag device for a front passenger's seat according to a second embodiment of the invention.

An airbag device 30 for the front passenger's seat is provided with guides 32 for guiding a movement of the frame 20 forward and backward. A winder 34 is disposed at a rear part of the container 12, wherein wires 36 wound around the winder 34 are extended or disposed through wire guides 38, and ends of the wires 36 are connected to the frame 20.

In this embodiment, in accordance with the vehicle collision speed or weight of the occupant in the front passenger's seat, the wires 36 are wound up or withdrawn to move the frame 20 forward or backward. Accordingly, the protruding length of the inflated airbag 14 from the container 12 can be adjusted as in the embodiment in FIG. 3.

Figure 5:
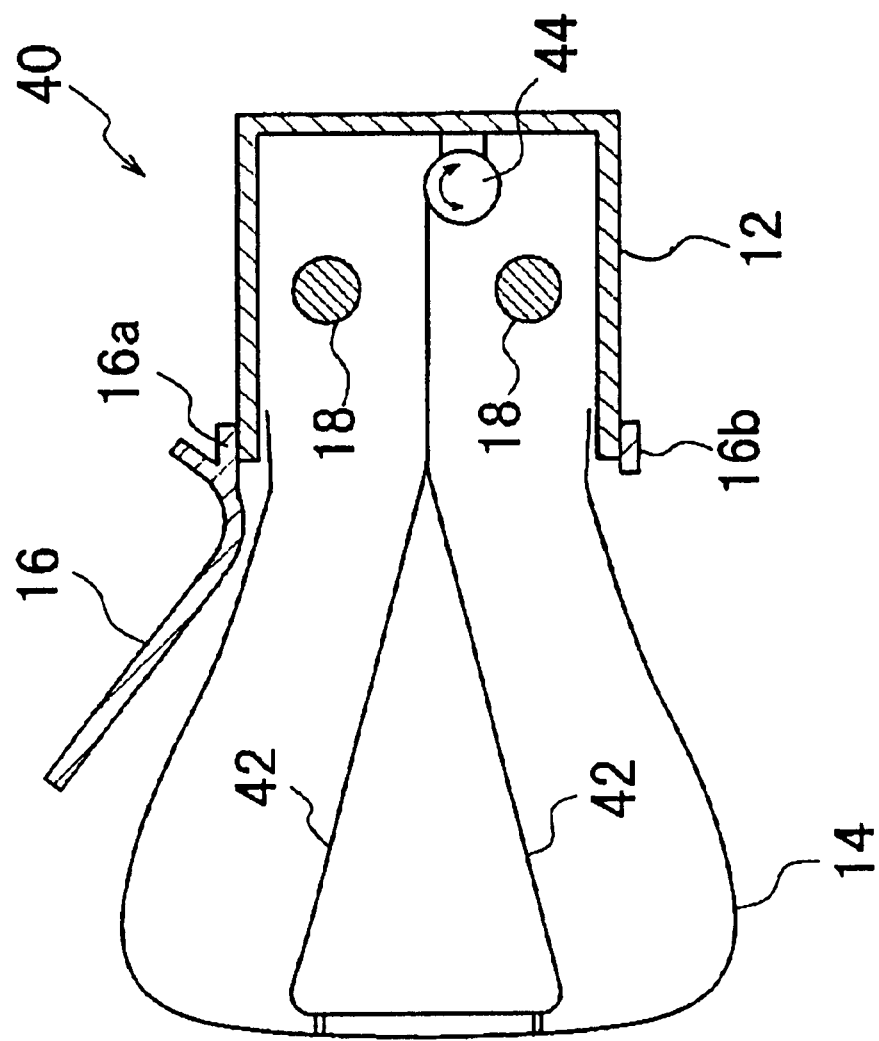
FIG. 5 is an explanatory sectional view of an airbag device for a front passenger's seat according to a third embodiment of the invention, wherein the airbag device is in the actuated state.

FIG. 5 is an explanatory sectional view of an airbag device for a front passenger's seat according to a third embodiment of the invention, wherein the airbag device is in the actuated state.

In an airbag device 40, a rear end portion of the airbag 14 is directly connected and fixed to the container 12. One end of a tether belt 42 is connected to the distal end of the airbag 14 by sewing or the like. The other end of the tether belt 42 is attached to a winder 44 such that the tether belt 42 is capable of being wound around the winder 44. When the inflator 18 is actuated in the event of vehicle collision, the airbag 14 is inflated so that the tether belt 42 is stretched tightly. In this case, in accordance with the vehicle collision speed or the weight of the occupant in the front passenger's seat, a length of winding the tether belt 44 is controlled, so that the protruding length of the airbag 14 from the container 12 can be adjusted as in the embodiment of FIG. 3.

Figure 6:
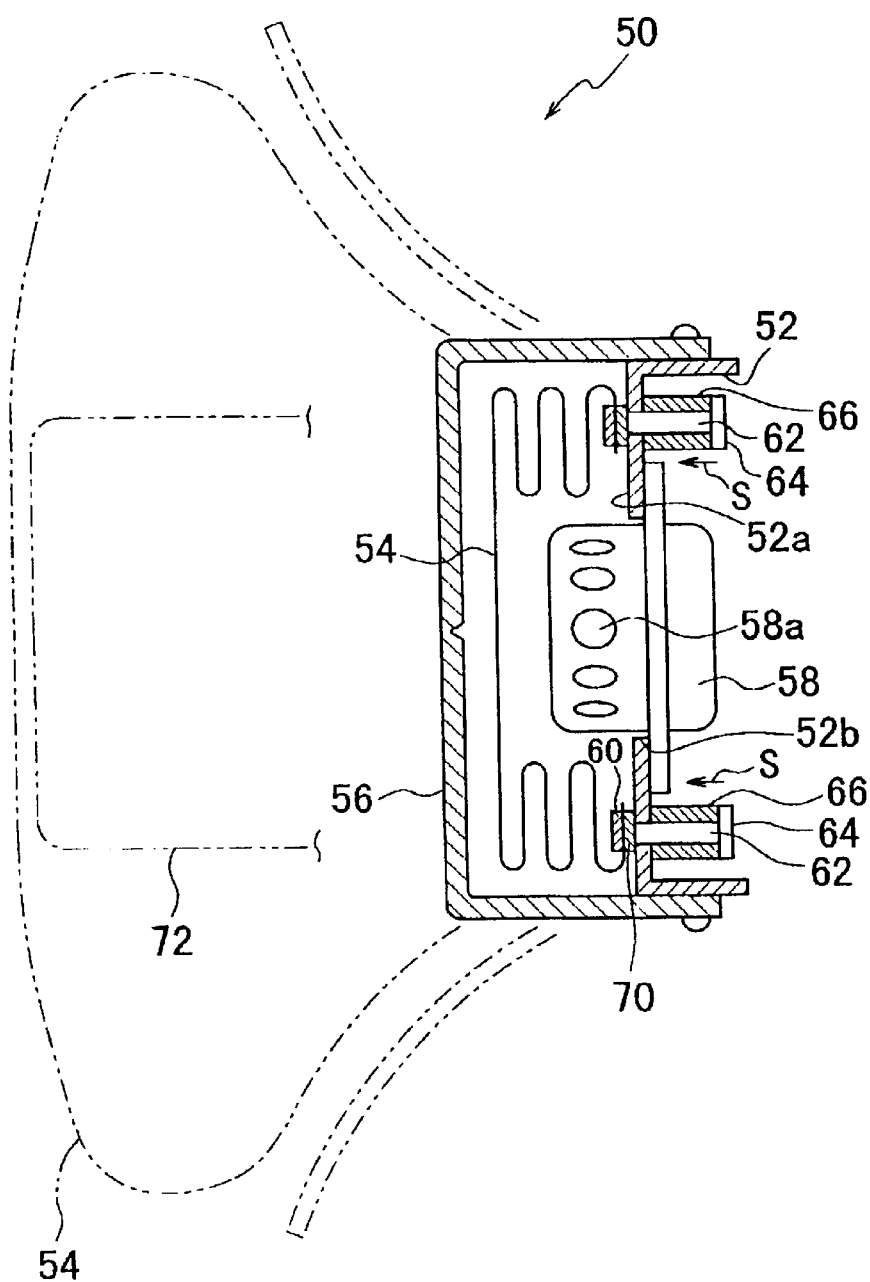
FIG. 6 is an explanatory sectional view of an airbag device for a driver's seat according to an embodiment of the present invention.

FIG. 6 is an explanatory sectional view of an airbag device for a driver's seat according to an embodiment of the present invention.

An airbag device 50 includes a retainer 52 disposed at a steering wheel; a folded airbag 54; a module cover 56 for covering the airbag 54; an inflator 58; a frame 60 to which a base end of the airbag 54 is connected; rods 62 connected to the frame 60; flanges 64 at rear ends of the rods 62; and piezoelectric displacement elements 66. Each piezoelectric displacement element is sandwiched by a main plate portion 52a of the retainer 52 and the flange 64.

A distal end side of the inflator 58 passes through a central opening 52b of the main plate portion 52a of the retainer 52, and projects forwardly from the retainer main plate portion 52a. The distal end side of the inflator 58 is provided with gas spouting holes 58a.

A rear end of the airbag 54 is fixed to the frame 60 by holding members 70, such as nuts.

One end of the tether belt 72 is connected to the distal end side of the airbag 54, and the other end of the tether belt 72 is connected to the frame 60.

When the vehicle collides, the inflator 58 is actuated, and the module cover 56 is opened and torn, so that the airbag 54 is inflated and the tether belt 72 is stretched tightly.

At this time, in case the vehicle collision speed is more than a predetermined value, or in case a weight of the occupant in the driver's seat is more than a predetermined value, voltage is applied to the piezoelectric displacement elements 66 so as to shorten the length of the rod 62 of the piezoelectric displacement elements 66 in the longitudinal direction. Accordingly, the frame 60 is moved in a direction of an arrow S, so that the protruding length of the airbag 54 from the retainer 52 is adjusted. Incidentally, as the collision speed becomes faster, or as the weight of the occupant becomes heavier, the voltage applied to the piezoelectric displacement element 66 may be increased to increase an amount of movement of the frame 60. Also, the piezoelectric displacement elements 66 may be laminated in layers, and by increasing or decreasing a number of the piezoelectric displacement elements 66, the amount of movement thereof can be adjusted.

As described above, in the airbag device according to the present invention, since the position of the distal end of the inflated airbag can be adjusted, the position of the airbag can be adjusted in accordance with the vehicle collision speed or the weight of the occupant. Thus, the driver or occupant can be protected at a best protection position and holding ability of the airbag as compared with the conventional airbag device. Also, since the driver or occupant is protected at an earlier stage of the vehicle collision, the load that the driver or occupant receives is reduced, so that the energy absorbing amount required by the airbag device is reduced as well. The driver or occupant can be protected more safely.

While the invention has been explained with reference to the specific embodiments of the invention, the explanation is illustrative and the invention is limited only by the appended claims.

What is claimed is:

1. An airbag device, comprising:
   an airbag,
   a holding device attached to the airbag for holding the airbag,
   gas supply means communicating with the airbag for supplying gas into the airbag to inflate the airbag, and
   adjusting means connected to the holding device, said adjusting means, upon inflation of the airbag, being actuated to move the holding device for adjusting a location of the airbag.

2. An airbag device according to claim 1, wherein said adjusting means includes a movable member connected to a rear portion of the airbag, and an adjusting member for adjusting a position of the movable member.

3. An airbag device according to claim 1, wherein said adjusting means includes a belt having one end connected to a distal end of the airbag and a rear end, and a supporting device for supporting the rear end of the belt, said supporting device adjusting a length of the belt extending from the supporting device.

4. An airbag device according to claim 1, further comprising a retaining member for supporting the gas supply means, said adjusting means being attached to the retaining member so that the location of the airbag is adjusted relative to the retaining member.

5. An airbag device according to claim 4, wherein said holding device is attached to a rear portion of the airbag, said adjusting means moving the holding device upon inflation of the airbag.

6. An airbag device according to claim 5, wherein said adjusting means includes a cylinder attached to the retaining member, and a piston attached to the holding device, said piston being moved upon inflation of the airbag.

7. An airbag device according to claim 5, wherein said adjusting means includes a winder attached to the retaining member, and a wire extending from the winder and connected to the holding device, a length of the wire to the winder being adjusted upon inflation of the airbag.

8. An airbag device according to claim 5, wherein said adjusting means is a piezoelectric element situated between the retaining member and the holding device so that when the piezoelectric element is actuated, the holding device is moved.

9. An airbag device according to claim 3, wherein said supporting device is a winder for winding the belt.

10. An airbag device according to claim 1, further comprising a condition sensor for sensing a condition at a time of airbag inflation so that the location of the airbag is adjusted based on the condition detected by the condition sensor.

* * * * *